(12) United States Patent
Xie

(10) Patent No.: US 9,900,506 B2
(45) Date of Patent: Feb. 20, 2018

(54) METHOD AND ELECTRONIC DEVICE FOR SHOOTING PANORAMIC PHOTOGRAPH

(75) Inventor: Jinqiang Xie, Shenzhen (CN)

(73) Assignee: ZTE CORPORATION (CN)

( * ) Notice: Subject to any disclaimer, the term of this patent is extended or adjusted under 35 U.S.C. 154(b) by 333 days.

(21) Appl. No.: 14/395,174

(22) PCT Filed: Jul. 17, 2012

(86) PCT No.: PCT/CN2012/078754
§ 371 (c)(1),
(2), (4) Date: Oct. 17, 2014

(87) PCT Pub. No.: WO2013/155804
PCT Pub. Date: Oct. 24, 2013

(65) Prior Publication Data
US 2015/0103139 A1    Apr. 16, 2015

(30) Foreign Application Priority Data

Apr. 20, 2012 (CN) .......................... 2012 1 0118607

(51) Int. Cl.
| | |
|---|---|
| *H04N 7/18* | (2006.01) |
| *H04N 5/232* | (2006.01) |
| *G03B 35/04* | (2006.01) |
| *H04N 13/02* | (2006.01) |
| *G03B 5/00* | (2006.01) |
| *G03B 37/02* | (2006.01) |
| *H04N 5/238* | (2006.01) |
| *H04N 13/00* | (2018.01) |

(52) U.S. Cl.
CPC ........... *H04N 5/23238* (2013.01); *G03B 5/00* (2013.01); *G03B 35/04* (2013.01); *G03B 37/02* (2013.01); *H04N 5/238* (2013.01); *H04N 13/0207* (2013.01); *H04N 13/0007* (2013.01)

(58) Field of Classification Search
CPC ............................ G03B 37/04; G06T 3/4038
USPC ............................................................ 348/39
See application file for complete search history.

(56) References Cited

U.S. PATENT DOCUMENTS

| | | | | |
|---|---|---|---|---|
| 5,262,867 A | * | 11/1993 | Kojima ..................... | G01S 5/18 |
| | | | | 348/231.6 |
| 2007/0189747 A1 | * | 8/2007 | Ujisato .................. | G03B 37/04 |
| | | | | 396/72 |

(Continued)

FOREIGN PATENT DOCUMENTS

| | | |
|---|---|---|
| CN | 1979335 A | 6/2007 |
| CN | 102033415 A | 4/2011 |

(Continued)

OTHER PUBLICATIONS

European Search Report dated Jun. 8, 2015 of European patent Application No. 12874817.5.

*Primary Examiner* — Leron Beck
(74) *Attorney, Agent, or Firm* — Plumsea Law Group, LLC

(57) ABSTRACT

The method for taking a panoramic photograph includes: determining a shooting focal distance and a shooting visual angle; shooting at least two photographs, comprising all objects required to be shot in an area of the shooting visual angle, according to the shooting focal distance and the shooting visual angle which are determined; and processing the at least two photographs to obtain one panoramic photograph. The corresponding device for taking a panoramic photograph is also provided.

8 Claims, 3 Drawing Sheets

(56) References Cited

U.S. PATENT DOCUMENTS

2012/0026284 A1* 2/2012 Watanabe .......... H04N 5/23296
                                                        348/36
2012/0033030 A1* 2/2012 Liu ..................... H04N 7/15
                                                        348/14.08

FOREIGN PATENT DOCUMENTS

| CN | 102209197 A | 10/2011 |
| JP | 09-171221 A | 6/1997 |
| JP | 2000-295504 A | 10/2000 |
| JP | 2007-334558 A | 12/2007 |
| JP | 2009-049854 A | 3/2009 |

* cited by examiner

US 9,900,506 B2

METHOD AND ELECTRONIC DEVICE FOR SHOOTING PANORAMIC PHOTOGRAPH

CLAIM FOR PRIORITY AND CROSS-REFERENCE TO RELATED APPLICATION(S)

This application is the US National Phase application of PCT application number PCT/CN2012/078754 having a PCT filing date of Jul. 17, 2012, which claims priority of Chinese patent application 201210118607.0 filed on Apr. 20, 2012, the disclosures of which are hereby incorporated by reference.

TECHNICAL FIELD

The present document relates to the communication field, and in particular, to a photograph shooting method and electronic device.

BACKGROUND OF THE RELATED ART

For the mobile phone or other device with the lens assembly, its focal distance may be fixed; in this case, its shooting visual angle is fixed as well. The size of its visual angle can be relatively changed through the digital zoom; when the visual angle becomes larger, the imaging area becomes larger, but each object in the presented image becomes smaller; when the visual angle becomes smaller, the imaging area becomes smaller, and the object in the presented image will become larger correspondingly. In addition, even the shooting visual angle can be changed through the zoom, the change of its shooting visual angle is limited.

For the characteristic of the above-mentioned lens, it can be summarized that the mobile phone lens or the shooting system has the following insufficiency:

1, when the mobile phone is fixed, it cannot shoot the scene outside the visual angle.

When the mobile phone is fixed, that is, when the position of the mobile phone maintains unchanged, its shooting area is limited; when the focal distance is fixed, the scene outside the visual angle cannot be shot, even if the visual angle is expanded by the zoom, but limited to that the zoon area is limited, perhaps there still are some scenes which cannot be shot, even if they are shot, the display in the photograph is quite small and it may not be clear enough.

2, the mobile phone cannot shoot the panoramic photograph directly.

For the current mobile phone with the function of panoramic shooting, when shooting the panoramic photograph, usually the mobile phone is rotated manually to shoot several photographs in successive orientations, and then the software within the mobile phone is used to combine the panoramic photograph. The defect of this method is that in the shooting operation process, there will be the influence of human factors; in this way, it may cause the phenomena, for example, the scenes on several photographs are unable to be connected tightly, or the scenes are overlapped or isolated greatly etc.; no matter which kind of phenomenon it is, it will influence the quality of the panoramic photograph.

3, the mobile phone generally has only one single lens (excluding the front lens), and it is unable to shoot the three dimensions (3D) photograph.

The pixel of the mobile phone has already been very high, even some has reached the level of the digital camera. And some mobile phones has already supported the 3D display effect of naked eye. But the effect is still not very good when the mobile phone shoots the panoramic photograph or the 3D photograph, even a lot of mobile phones do not support the 3D shooting.

SUMMARY OF THE INVENTION

The embodiment of the present document will provide a photograph shooting method and electronic device, used for better shooting the panoramic photograph.

In order to solve the above-mentioned technical problem, the embodiment of the present document adopts the following technical scheme:

a photograph shooting method, applied in an electronic device with a lens assembly, comprises the following steps:

determining a shooting focal distance and a shooting visual angle;

shooting at least two photographs, comprising all objects required to be shot in an area of the shooting visual angle, according to the shooting focal distance and the shooting visual angle which are determined; and processing the at least two photographs to obtain a panoramic photograph.

Alternatively, the step of determining a shooting focal distance and a shooting visual angle comprises:

determining the shooting focal distance and a shooting mode according to a selection of a user, and determining the shooting visual angle according to the shooting mode.

Alternatively, the method further comprises:

before shooting at least two photographs according to the shooting focal distance and the shooting visual angle which are determined, determining the number of photographs required to be shot and position information of each shooting respectively according to the shooting focal distance and the shooting visual angle which are determined;

wherein, the step of shooting at least two photographs according to the shooting focal distance and the shooting visual angle which are determined comprises: making the lens assembly rotated to corresponding positions to shoot respectively according to the determined position information of each shooting, and shooting the photographs of which the number is equal to the number of photographs required to be shot according to the determined number of photographs required to be shot.

Alternatively, the step of processing the at least two photographs comprises:

jointing the at least two photographs, to obtain one panoramic photograph.

Alternatively, the step of jointing the at least two photographs comprises:

when the at least two photographs have overlap portions, and when jointing the at least two photographs, selecting the overlap portion of any photograph in the at least two photographs, or superposing the overlap portions of two photographs.

A photograph shooting method, applied in an electronic device with a lens assembly, comprises the following steps:

determining a shooting focal distance and an initial position of the lens assembly;

determining information of two shooting positions for shooting two photographs used for obtaining a three dimensions photograph, 3D photograph, according to the initial position of the lens assembly;

shooting one photograph at positions corresponding to the information of the two shooting positions respectively; and processing two shot photographs to obtain a 3D photograph.

Alternatively, the step of shooting one photograph at positions corresponding to the information of the two shooting positions respectively comprises:

making the lens assembly rotated to corresponding positions respectively to shoot one photograph respectively according to the determined information of the two shooting positions.

An electronic device, with a lens assembly, further comprises a first determination module, an imaging module and an image processing module, wherein:

the first determination module is configured to: determine a shooting focal distance and a shooting visual angle;

the imaging module is configured to: shoot at least two photographs, comprising all objects required to be shot in an area of the shooting visual angle, according to the shooting focal distance and the shooting visual angle which are determined;

the image processing module is configured to: process the at least two photographs to obtain a panoramic photograph.

Alternatively, the first determination module is configured to: determine a shooting focal distance and a shooting visual angle by the following way:

determining the shooting focal distance and a shooting mode according to a selection of a user, and determining the shooting visual angle according to the shooting mode.

Alternatively, the electronic device further comprises a second determination module and a torsion module, wherein:

the second determination module is configured to: determine the number of photographs required to be shot and position information of each shooting respectively according to the shooting focal distance and the shooting visual angle which are determined;

the torsion module is configured to: make the lens assembly rotated to corresponding positions to shoot respectively according to the determined position information of each shooting, and the imaging module is further configured to: shoot photographs of which the number is equal to the number of photographs required to be shot according to the determined number of photographs required to be shot.

Alternatively, the image processing module is configured to: process the at least two photographs to obtain one panoramic photograph by the following way:

jointing the at least two photographs, to obtain one panoramic photograph.

Alternatively, the image processing module is further configured to:

when the at least two photographs have overlap portions, and when jointing the at least two photographs, select the overlap portion of any photograph in the at least two photographs, or superpose the overlap portions of the two photographs.

An electronic device, with a lens assembly, comprises a first determination module, a second determination module, an imaging module and an image processing module, wherein:

the first determination module is configured to: determine a shooting focal distance and an initial position of the lens assembly;

the second determination module is configured to: determine information of two shooting positions for shooting two photographs used for obtaining a three dimensions photograph, 3D photograph, according to the initial position of the lens assembly;

the imaging module is configured to: shoot one photograph at positions corresponding to the information of the two shooting positions respectively;

the image processing module is configured to: process two shot photographs to obtain a 3D photograph.

Alternatively, the electronic device further comprises a torsion module, wherein:

the torsion module is configured to: make the lens assembly rotated to corresponding positions respectively according to the determined information of the two shooting positions; and the imaging module is further configured to: shoot one photograph at corresponding positions respectively.

The photograph shooting method in the embodiment of the present document includes: determining a shooting focal distance and a shooting visual angle; the lens assembly automatically shooting at least two photographs, including all objects required to be shot in an area of the shooting visual angle, according to the shooting focal distance and the shooting visual angle which are determined; and processing the at least two photographs to obtain one panoramic photograph. After determining the shooting focal distance and the shooting visual angle, the electronic device can perform shooting automatically, and it can shoot at least two photographs automatically, and then processes the shot photograph, to obtain one panoramic photograph, thus providing a panoramic photograph shooting method, in order to shoot all objects in the selected area clearly, and further obtain the panoramic photograph with a better effect.

DETAILED DESCRIPTION

The photograph shooting method in the embodiment of the present document includes determining a shooting focal distance and a shooting visual angle; automatically shooting at least two photographs, comprising all objects required to be shot in an area of the shooting visual angle, according to the shooting focal distance and the shooting visual angle which are determined; and processing the at least two photographs to obtain one panoramic photograph. After determining the shooting focal distance and the shooting visual angle, the electronic device can perform shooting automatically, and it can shoot at least two photographs automatically, and then process the shot photographs to obtain one panoramic photograph, thus providing a panoramic photograph shooting method, in order to shoot all objects in the selected area clearly and further obtain the panoramic photograph with a better effect.

The photograph shooting method in the embodiment of the present document is introduced through the realizing procedures hereinafter.

Figure 1:
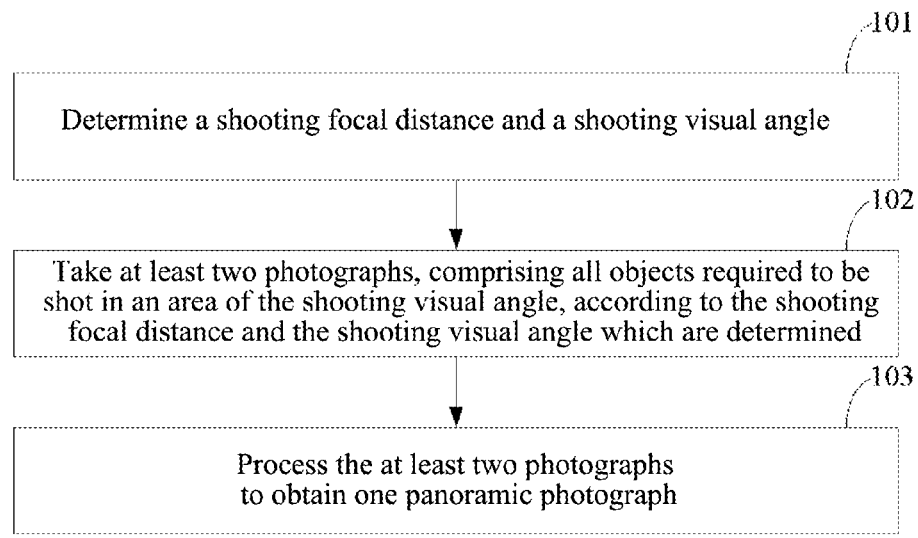
FIG. 1 is a flow chart of a major photograph shooting method according to an embodiment of the present document.

Referring to FIG. 1, a major method flow of photograph shooting in the embodiment of the present document is as follows, and the method can be applied in an electronic device with a lens assembly and an imaging system.

In step 101, a shooting focal distance and a shooting visual angle are determined.

In the embodiment of the present document, the electronic device can have many kinds of shooting modes, for example, it can have a normal mode, a panoramic mode, a 3D mode, a video recording mode, etc., the user can shoot normally in the normal mode, shoot the panoramic photograph in the panoramic mode, shoot the 3D photo in the 3D mode and record a video in the video recording mode. Before determining the shooting focal distance and the shooting visual angle, the shooting mode can be determined at first. What the present embodiment introduces is the panoramic photograph shooting method, therefore, the shooting mode can be determined as the panoramic mode at first.

Under the panoramic mode, it can have many kinds of panoramic submodes as well, for example, the first panoramic submode can be an up-and-down panoramic mode, that is, the panoramic photograph can be shot in the up-and-down direction, and if the user selects that submode, then the shooting visual angle is stationary; the second panoramic submode can be a left-and-right panoramic mode, that is, the panoramic photograph can be shot in the left and right direction, and if the user selects that submode, then the shooting visual angle is stationary; the third panoramic submode can be a preset panoramic submode, that is, the shooting visual angle, etc., can be customized by the user.

As to the first panoramic submode, the electronic device can perform automatic shooting promptly after the user selects the focal distance, and the panoramic area of the shooting can be the maximum area for turning left and right of the torsion module of the electronic device.

As to the second panoramic submode, the electronic device can perform automatic shooting promptly after the user selects the focal distance, and the panoramic area of the shooting can be the maximum area for turning up and down of the torsion module of the electronic device.

As to the third panoramic submode, the user can select the focal distance at first and select the shooting visual angle to be shot manually after the focal distance is selected, that is, the shooting boundary point can be selected manually. For example, the electronic device is a mobile phone, and the mobile phone is with a touch screen, then the user can select the single boundary of the panoramic shooting through slipping a single finger on the touch screen; when the scene displayed on the touch screen reaches a panoramic boundary that the user wants to select, then the touch screen is clicked, which indicates that the current position is selected as a boundary point, and then another boundary point can be selected through slipping the single finger on the touch screen again, and when the scene displayed on the touch screen reaches a panoramic boundary that the user wants to select, then the user can click the touch screen which indicates that the point is selected as the second boundary point. After selecting two boundary points, the user can click the touch screen again, then the mobile phone shoots the panoramic photograph automatically, or, the user can click the touch screen after reaching the second boundary point, and the mobile phone starts to shoot the panoramic photograph.

After the shooting mode is determined, the shooting visual angle is correspondingly determined as well.

In step 102, at least two photographs is shot according to the shooting focal distance and the shooting visual angle which are determined, and the at least two photographs include all objects required to be shot in the area of the shooting visual angle.

After determining the shooting focal distance and the shooting visual angle, the electronic device can shoot at least two photographs automatically.

When the electronic device shoots the photographs, the purpose is to shoot all objects required to be shot in the area of selected visual angle under the selected focal distance, and the quantity of shot photographs is as small as possible; the fewer the shot photographs are, the fewer the places where the jointing may not be so good when the photographs are processed to be the panoramic photograph, and the better the quality of obtained panoramic photograph is. For the number of the shooting and the position information, the electronic device will automatically calculate according to the zoom multiple and the selected boundary point. Wherein, the position information means the position information of the position where the lens assembly is located in the electronic device during the shooting.

Wherein, there can be overlap portions in the at least two shot photographs, and there can be no overlap portions. For example, if it needs to shoot three photographs, then these three photographs can be jointed just right, or there can be overlap portions between the first and the second photographs and overlap portions between the second and the third photographs; alternatively, the size of these two overlap portions can be the same.

Figure 2:
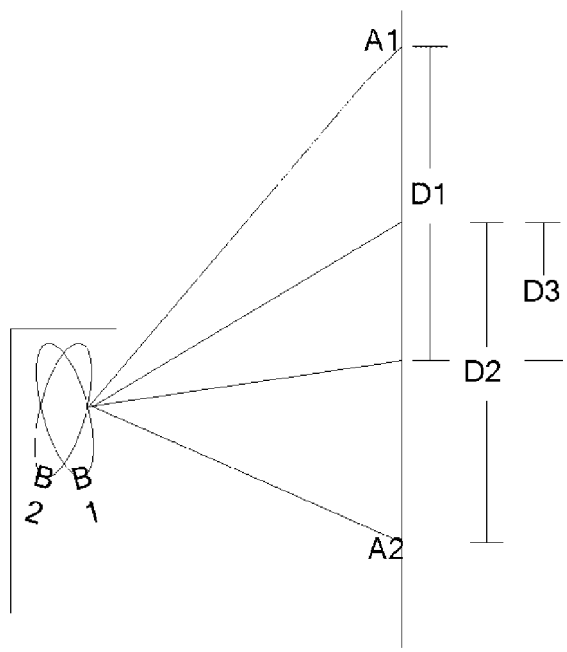
FIG. 2 is a diagram of shooting a panoramic photograph according to an embodiment of the present document.

It is illustrated by taking FIG. 2 as examples. In FIG. 2, the user selects a panoramic boundary point A1 at first and also selects another panoramic boundary point A2. Later, according to the current shooting focal distance and the angle between the two panoramic boundary points A1 and A2, the electronic device can automatically calculate the number of shooting and position information of each shooting required to obtain the panoramic photograph. For example, in FIG. 2, the electronic device only needs to shoot twice, wherein, two positions where the torsion module in the electronic device automatically stops are the positions as shown by B1 and B2 in FIG. 2, the positions where the torsion module stops are the position information for shooting, and the areas of two shot photographs are D1 and D2 respectively.

In step 103, the at least two photographs are processed to obtain one panoramic photograph.

After shooting all photographs required to be shot, the electronic device processes the photographs obtained by shooting automatically, for example, the processing mode can be jointing, to obtain one panoramic photograph; the panoramic photograph includes all objects required to be shot in the area of selected shooting visual angle, and the objects can be shot quite clearly because the shootings are performed separately, which is convenient for the user to watch.

For example, as shown in FIG. 2, after finishing the shooting, the image processing module in the electronic device will process two photographs of which the areas are D1 and D2 automatically according to the current state (the shooting focal distance) and the shooting position, and the processing result may be to connect the coincident portion D3 of the two photographs, wherein, the connection mode can be: both D1 and D2 include D3, therefore the D3 of any photograph can be selected, or the D3 in D1 and the D3 in D2 can be superposed as well, so that they are combined into one layer. In addition, D1 (or D2) can be selected directly, and then D1 (or D2) and the area except the public portion D3 in D2 (or the area except the public portion D3 in D1) can be connected. In a word, the area of scene, combined and displayed finally, is the area between the top line and the bottom line in FIG. 2. After obtaining the panoramic photograph, the electronic device can delete two shot photographs of which the areas are D1 and D2 respectively, in order to save the memory space.

The panoramic photograph shooting method in the present document, is introduced through several embodiments hereinafter.

Embodiment One the electronic device is a mobile phone, and the mobile phone is with a touch screen. The mobile phone has four modes during shooting, which are respectively the normal mode, the panoramic mode, the 3D mode and the video recording mode.

The user selects the shooting focal distance as the first choice.

The user selects the shooting mode as the panoramic mode and selects the first panoramic submode, that is, the panoramic photograph can be shot in the up-and-down direction, and meanwhile, the shooting visual angle has already been fixed, as the first preset shooting visual angle.

After the shooting focal distance and the shooting visual angle are selected, the mobile phone starts to automatically calculate the number of shooting and position information of each shooting required to obtain the panoramic photograph; it is still illustrated by taking FIG. 2 as examples, the mobile phone calculates that it needs to shoot twice to obtain the panoramic photograph, and two shooting positions are the positions represented by B1 and B2 in FIG. 2 respectively.

The user click the corresponding button on the touch screen, and the mobile phone starts to shoot automatically, for example, the torsion module in the mobile phone controls the lens assembly to turn to the position shown as B1 at first, shooting a photograph, and then the torsion module also controls the lens assembly to turn to the position shown as B2, shooting another photograph.

After finishing the shooting, the mobile phone automatically processes two photographs obtained by shooting. Wherein, the scene area of the first photograph is D1, the scene area of the second photograph is D2, and the overlap portion of the two is D3. During processing, the D3 portion of any photograph can be selected; the mobile phone selects the D3 portion of the first photograph, and joints the two photographs, processing them to be one panoramic photograph, and the panoramic photograph includes all objects required to be shot in the area of selected visual angle.

Embodiment Two the electronic device is a mobile phone, and the mobile phone is with a touch screen. The mobile phone has four modes during shooting, which are respectively the normal mode, the panoramic mode, the 3D mode and the video recording mode.

The user selects the shooting focal distance as the first choice.

The user selects the shooting mode as the panoramic mode and selects the third panoramic submode, that is, the shooting visual angle can be selected by oneself. For example, the user wants to select to shoot the photographs in the left-and-right direction, as shown in FIG. 2. The user can select the single boundary of the panoramic shooting through slipping a single finger on the touch screen; when the scene displayed on the touch screen reaches a panoramic boundary that the user wants to select, then the touch screen is clicked, which indicates that the current position is selected as a boundary point, that is, point A1 in FIG. 2, and then another boundary point can be selected through slipping the single finger on the touch screen again, and when the scene displayed on the touch screen reaches a panoramic boundary that the user wants to select, then the user can click the touch screen, which indicates that the point is selected as the second boundary point, that is, point A2 in FIG. 2.

After selecting two boundary points, the mobile phone starts to automatically calculate the number of shooting and position information of each shooting required to obtain the panoramic photograph; as shown in FIG. 2, the mobile phone calculates that it needs to shoot twice to obtain the panoramic photograph, and two shooting positions are the positions represented by B1 and B2 in FIG. 2 respectively. For users, the calculation time of the mobile phone can be neglected, and the user can click the corresponding button on the touch screen again after selecting two boundary points, and then the mobile phone shoots the panoramic photograph automatically.

For example, the torsion module in the mobile phone controls the lens assembly to turn to the position shown as B1 at first, shooting one photograph, and then the torsion module also controls the lens assembly to turn to the position shown as B2, shooting another photograph.

After finishing the shooting, the mobile phone automatically processes two photographs obtained by shooting. Wherein, the scene area of the first photograph is D1, the scene area of the second photograph is D2, and the overlap portion of the two is D3. During processing, the D3 portion of any photograph can be selected, and the mobile phone selects to perform superposition processing on the D3 portions of two photographs and process them as one layer, and then it joints two photographs, processing them to be one panoramic photograph, and the panoramic photograph includes all objects required to be shot in the area of selected visual angle.

Figure 3:
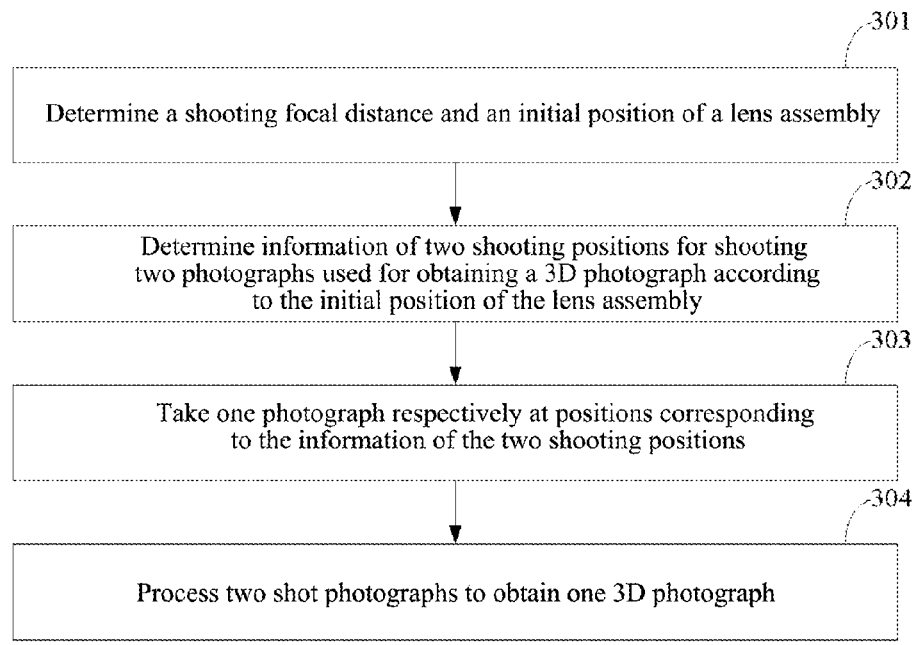
FIG. 3 is a flow chart of another major photograph shooting method according to an embodiment of the present document.

Referring to FIG. 3, the embodiment of the present document further provides a photograph shooting method, which can be applied in an electronic device with a lens assembly, and the main procedures of the method is as follows.

In step 301, a shooting focal distance and an initial position of the lens assembly are determined.

In the embodiment of the present document, the electronic device can have many kinds of shooting modes, for example, it can have a normal mode, a panoramic mode, a 3D mode, a video recording mode, etc., the user can shoot normally in the normal mode, shoot the panoramic photograph in the panoramic mode, shoot the 3D photo in the 3D mode and record a video in the video recording mode. Before determining the shooting focal distance and the shooting visual angle, the shooting mode can be determined at first. What the present embodiment introduces is the 3D photograph shooting method, and therefore, the shooting mode can be determined as the 3D mode at first.

Figure 4:
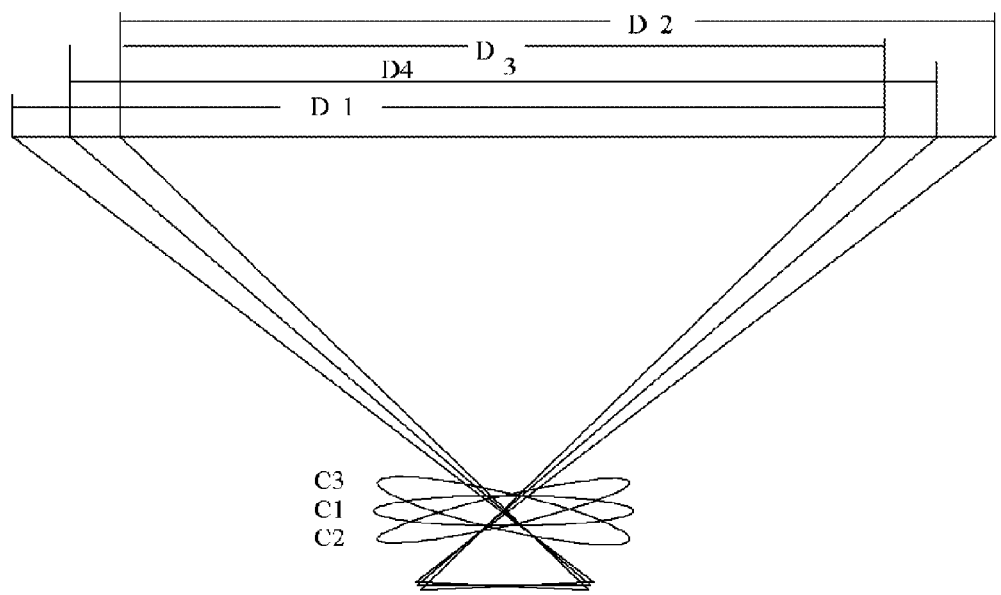
FIG. 4 is a diagram of shooting a 3D photograph according to an embodiment of the present document.

For example, in FIG. 4, the initial position of the lens assembly is the position as shown by C1.

In step 302, information of two shooting positions for shooting two photographs used for obtaining a 3D photograph is determined according to the initial position of the lens assembly.

The shooting position refers to the position where the lens assembly is located during the shooting.

For example, as shown in FIG. 4, the users selects the shooting focal distance and determines the initial position of the lens assembly as the position shown by C1, that is, the 3D image area required to be obtained, then the electronic device can automatically calculate the positions where two shootings are located according to the current shooting focal distance and the initial position of the lens assembly. The positions where the two shootings are located can be laid out symmetrically by taking the initial position of the lens assembly as the center, which makes the images presented at such two positions are consistent with the images that are presented by people observing the objects through eyes as possible, in order to make the effect of the obtained 3D photograph better; for example, other two shooting positions are the positions shown by C2 and C3 respectively.

In step 303, one photograph is shot respectively at positions corresponding to the information of the two shooting positions.

For example, the torsion module in the mobile phone controls the lens assembly to turn to the position shown as C2 at first, shooting one photograph, and then the torsion module also controls the lens assembly to turn to the position shown as C3, shootings another photograph. Wherein, the area covered by the first photograph is D1, and the area covered by the second photograph is D2.

In step 304, two shot photographs are processed to obtain a 3D photograph.

After finishing the shooting, two photographs that the covered areas are respectively D1 and D2 are obtained as shown in FIG. 4, and the image processing module in the electronic device can process these two photographs, for example, the processing mode can be superposition or other processing modes, to finish composing the 3D photograph, and the area covered by the finally obtained 3D photograph is the D3 area in FIG. 4.

FIG. 4 also shows a D4 area; if shooting is performed at the initial position of the lens assembly, then the area covered by the shot photograph is the D4 area, and the D3 area is obviously slightly smaller than the D4 area. At the boundary of the D3 area and the D4 area, its effect is not 3D effect, but it can generally be neglected. Alternatively, while selecting the D4 area, it can be selected a bit greater through appropriate focusing, thus the D3 area become larger correspondingly as well, which will not produce great influence on the final 3D effect. In fact, after selecting the 3D mode, what the display directly displays is the scene range of the 3D photograph that will be finished finally, such as D3 in FIG. 4.

After finishing the composition of 3D photograph, the electronic device can delete two temporary photographs in the shooting process, that is, the two photographs of which the covered areas are D1 and D2 respectively, in order to save the memory space.

The 3D photograph shooting method in the embodiment of the present document is introduced through several embodiments hereinafter.

Embodiment Three the electronic device is a mobile phone, and the mobile phone is with a touch screen. The mobile phone has four modes during shooting, which are respectively the normal mode, the panoramic mode, the 3D mode and the video recording mode.

The user selects the shooting focal distance at first and selects the shooting mode as the 3D mode.

The user determines the initial position of the lens assembly, and it is illustrated by taking FIG. 4 as examples, and the initial position of the lens assembly is the C1 position as shown in FIG. 4.

The electronic device can automatically calculate the positions where two shootings are located according to the current shooting focal distance and the initial position of the lens assembly. The positions where the two shootings are located can be laid out symmetrically by taking the initial position of the lens assembly as the center, which makes the images presented at such two positions are consistent with the images that are presented by people observing the objects through eyes as possible, for example, other two shooting positions are the positions shown by C2 and C3 respectively.

The torsion module in the mobile phone controls the lens assembly to turn to the position shown as C1 at first, shooting one photograph, and then the torsion module also controls the lens assembly to turn to the position shown as C2, shooting another photograph. Wherein, the area covered by the first photograph is D1, and the area covered by the second photograph is D2.

The image processing module in the electronic device can process these two photographs, and the processing mode in the embodiment of present document can be superposition, or other processing modes, to finish composing the 3D photograph, and the area covered by the finally obtained 3D photograph is the D3 area in FIG. 4.

After finishing the composition of 3D photograph, the electronic device can delete two temporary photographs in the shooting process, that is, two photographs of which the covered areas are D1 and D2 respectively.

Figure 5:
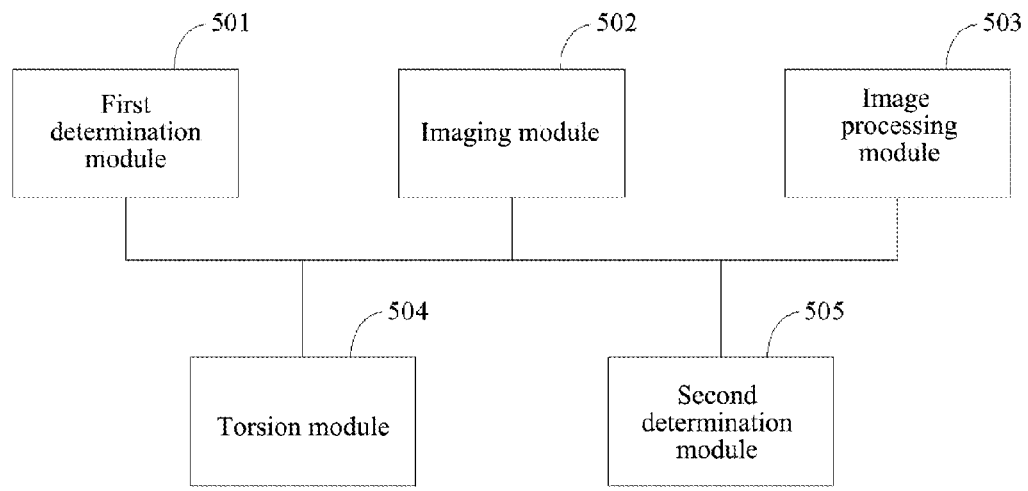
FIG. 5 is a major structure diagram of an electronic device according to an embodiment of the present document.

Referring to FIG. 5, the electronic device of the embodiment of present document can include a first determination module 501, an imaging module 502 and an image processing module 503.

The first determination module 501 is configured to: determine a shooting focal distance and a shooting visual angle.

The first determination module 501 is configured to: determine a shooting focal distance and a shooting visual angle by the following way: determining the shooting focal distance and a shooting mode according to a selection of a user, and determining the shooting visual angle according to the shooting mode.

The first determination module 501 is further configured to: shoot at least two photographs according to the determined number of photographs required to be shot and position of each shooting.

The imaging module 502 is configured to: shoot at least two photographs, comprising all objects required to be shot in an area of the shooting visual angle, according to the shooting focal distance and the shooting visual angle which are determined; and The imaging module 502 is further configured to: shoot photographs of which the number is equal to the number of photographs required to be shot according to the determined number of photographs required to be shot.

The imaging module 502 can include the lens assembly and an imaging unit, and the objects shot by the lens assembly are imaged on the imaging unit. The imaging unit can be connected with the lens assembly.

The image processing module 503 is configured to: process the at least two photographs to obtain one panoramic photograph.

The image processing module 503 is configured to: process the at least two photographs to obtain one panoramic photograph by the following way: jointing the at least two photographs, to obtain one panoramic photograph; and when the at least two photographs have overlap portions, and when jointing the at least two photographs, select the overlap portion of any photograph in the at least two photographs, or superpose the overlap portions of the two photographs, to process them as one layer.

The electronic device can further include a torsion module 504, and the torsion module 504 is configured to: make the lens assembly rotated to corresponding positions to shoot respectively according to the determined position information of each shooting.

Wherein, when the torsion module 504 turns the lens assembly, it also can make the imaging unit turn together with the lens assembly at the same time, in order to obtain the better shooting effect.

The electronic device can further include a second determination module 505, and the second determination module 505 is configured to: determine the number of photographs required to be shot and position information of each shooting respectively according to the shooting focal distance and the shooting visual angle which are determined.

The embodiment of the present document further provides an electronic device, which can includes a first determination module 501, a second determination module 505, an imaging module 502 and an image processing module 503, and the electronic device can further include a torsion module 504. The electronic device can be the same as the electronic device shown in FIG. 5.

The first determination module 501 is configured to: determine a shooting focal distance and an initial position of the lens assembly;

The second determination module 505 is configured to: determine information of two shooting positions for shooting two photographs used for obtaining a 3D photograph according to the initial position of the lens assembly;

The imaging module 502 is configured to: shoot one photograph respectively at positions corresponding to the information of the two shooting positions.

The imaging module 502 can be configured to shoot one photograph respectively at positions corresponding to the information of the two shooting positions according to the following way: shooting the photograph at a position where the lens assembly stops, that it, shooting one photograph at the corresponding positions respectively. The corresponding positions refer to the positions to which the lens assembly is made to turn respectively by the torsion module 504 according to the determined information of other two shooting positions.

The imaging module 502 can include the lens assembly and the imaging unit, and the objects shot by the lens assembly are imaged on the imaging unit. The imaging unit can be connected with the lens assembly.

The image processing module 503 is configured to: process two shot photographs to obtain one 3D photograph.

The torsion module 504 is configured to: make the lens assembly rotated to corresponding positions respectively according to the determined information of other two shooting positions; and the lens assembly shoots one photograph respectively at the positions corresponding to the information of the two shooting positions.

Wherein, when the torsion module 504 turns the lens assembly, it also can make the imaging unit turn together with the lens assembly at the same time, in order to obtain the better shooting effect.

Figure 6:
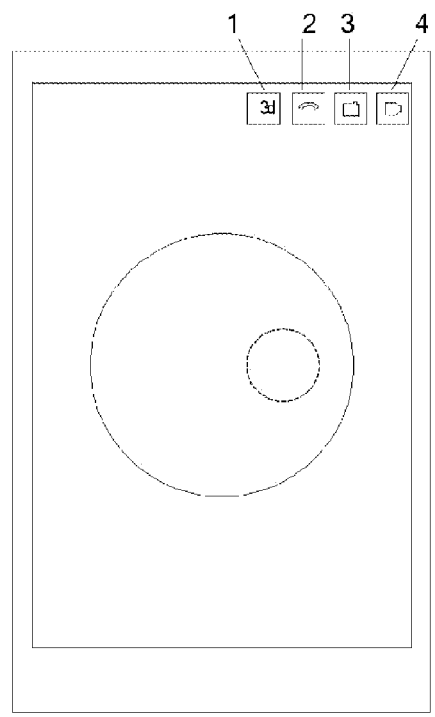
FIG. 6 is an operation diagram when the electronic device is a mobile phone according to an embodiment of the present document.

As shown in FIG. 6, if the electronic device is a mobile phone and the mobile phone is with a touch screen, the embodiment of present document provides a specific photograph shooting method.

There are four buttons on the touch screen in FIG. 6, which are indicated by Arabic numerals 1, 2, 3, 4 in FIG. 6 and respectively represent the 3D mode, the panoramic mode, the normal mode and the video recording mode in the shooting modes.

In addition, there are two fictitious circular frames in the middle of the touch screen, wherein, the greater circular frame represents the magnification, which can be changed through focusing, and the smaller circular frame represents the angle or orientation turned by the lens assembly; on display, the size of the smaller circular frame will not change, but the center of the circular frame can move, and the moving range is to make the smaller circular frame tangent with the greater circular frame. When the smaller circle and the greater circle are tangent, it indicates that the lens assembly has already turned to the maximum position in this orientation. In addition, the center position of the smaller circle in the present embodiment is contrary to the turning direction of the lens assembly, for example, if the center of the smaller circle is right under the center of the greater circle, then it represents that the lens assembly is corresponding to the upper area relative to the horizontal orientation. The greater circle in FIG. 6 is indicated by dotted line, and the smaller circle is indicated by dash line.

The present embodiment is only to provide an embodiment, and only used to explain the present document, rather than limiting the present document.

The photograph shooting method in the embodiment of present document includes: determining a shooting focal distance and a shooting visual angle; the lens assembly automatically shooting at least two photographs, including all objects required to be shot in an area of the shooting visual angle, according to the shooting focal distance and the shooting visual angle which are determined; and processing the at least two photographs to obtain one panoramic photograph. After determining the shooting focal distance and the shooting visual angle, the electronic device can perform shooting automatically, and it can shoot at least two photographs automatically, and then processes the shot photograph, to obtain one panoramic photograph, thus providing a panoramic photograph shooting method, in order to shoot all objects in the selected area clearly, and further obtain the panoramic photograph with a better effect.

The mobile phone in the related art needs to shoot the panoramic photograph manually, the effect of the panoramic photograph obtained in this way is definitely not very ideal, while the electronic device in the embodiment of the present document, after the user selects the shooting focal distance and the shooting visual angle, can obtain the photographs required to be shot and position information of shooting each photograph automatically for shooting one panoramic photograph, and it can shoot automatically, and it can compose the photograph obtained by shooting to be one panoramic photograph automatically after finishing the shooting, so that the obtained panoramic photograph is less influenced by the human factor, and the effect is better. And after obtaining the panoramic photograph, it can delete the single shot photograph, in order to save the memory space.

The mobile phone in the related art is unable to shoot the 3D photograph, while in the embodiment of the present document, the electronic device can calculate the position information for shooting other two photographs automatically according to the determined initial position of the lens assembly, and these other two photographs are two photographs which can be composed to be the 3D photograph; the electronic device can shoot automatically according to the calculation result, and the two photographs obtained by shooting can be composed to be the 3D photograph automatically after finishing the shooting, and when determining other two positions, the images presented at such two positions are made to be consistent with the images that are presented by people observing the objects through eyes as possible, in order to make the effect of the obtained 3D photograph better. And after obtaining the 3D photograph, it can delete the single shot photograph, in order to save the memory space.

When controlling the lens assembly to shoot, it can only make the lens assembly turn, so that the burden of whole electronic device is smaller, or the lens assembly turn together with the imaging unit, in order to obtain the better shooting effect.

Those skilled in the art should understand that the embodiment of the present invention document can provide a method, system, or computer program product. So, the embodiment of the present document can adopt forms of a complete hardware embodiment, a complete software embodiment, or an embodiment combining software and hardware aspects. And, the embodiment of the present document can adopt the form of the computer program product implemented on one or more storage mediums usable for the computer (including but not limited to the magnetic disc memory and the optical memory, etc.), including the program code usable for the computer.

The present document is described according to the method, device (system), and the flow chart and/or the block diagram of the computer program product in the embodiment of the present document. It should be understood that every procedure and/or block in the flow chart and/or the block diagram, and the combination of the procedure and/or block in the flow chart and/or the block diagram can be realized by the computer program command. These computer program commands can be provided to a general-purpose computer, a special purpose computer, an embedded processor or a processor of other programmable data processing equipment to produce a machine, so that the commands executed through the computer or the processor of other programmable data processing equipment produce an apparatus used for realizing the function specified in one procedure or multiple procedures of the flow chart and/or one block or multiple blocks of the block diagram.

These computer program commands also can be stored in the computer readable storage which can lead the computer or other programmable data processing equipment to work in a particular way, so that the commands stored in the computer readable storage produce the manufacturing products including the command apparatus, and the command apparatus realizes the function specified in one procedure or multiple procedures of the flow chart and/or one block or multiple blocks of the block diagram.

These computer program commands also can be loaded into the computer or other programmable data processing equipment, so that the computer or other programmable equipment execute a series of operation steps to produce the processing realized by the computer, therefore, the commands executed in the computer or other programmable equipment provide the steps for realizing the function specified in one procedure or multiple procedures of the flow chart and/or one block or multiple blocks of the block diagram.

Obviously, those skilled in the art can make various changes and modifications to the present document without departing from the spirit and range of the present invention document. In this way, if these changes and modifications of the present document are within the scope of the claims of present document and their equivalent technologies, then the present document intends to include these changes and modifications as well.

INDUSTRIAL APPLICABILITY

The photograph shooting method in the embodiment of the present document includes: determining a shooting focal distance and a shooting visual angle; the lens assembly automatically shooting at least two photographs, including all objects required to be shot in an area of the shooting visual angle, according to the shooting focal distance and the shooting visual angle which are determined; and processing the at least two photographs to obtain one panoramic photograph. After determining the shooting focal distance and the shooting visual angle, the electronic device can perform shooting automatically, and it can shoot at least two photographs automatically, and then processes the shot photograph, to obtain one panoramic photograph, thus providing a panoramic photograph shooting method, in order to shoot all objects in the selected area clearly, and further obtain the panoramic photograph with a better effect. The present document has very strong industrial applicability.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for taking a photograph, applied in an electronic device with a lens assembly, comprising:
   determining a shooting focal distance and a shooting visual angle;
   determining the number of photographs required to be shot and position information of each shooting respectively according to the shooting focal distance and the shooting visual angle which are determined, comprising: only after two boundary points are selected, calculating the number of photographs required to be shot and the position information according to zoom and selected boundary points;
   taking at least two photographs via the lens assembly, comprising all objects required to be shot in an area of the shooting visual angle, according to the shooting focal distance and the shooting visual angle which are determined, wherein, taking at least two photographs according to the shooting focal distance and the shooting visual angle which are determined comprises: making the lens assembly rotated to a corresponding position to shoot according to the determined position information of each shooting, and shooting photographs of which the number is equal to the number of photographs required to be shot according to the determined number of photographs required to be shot; and
   processing the at least two photographs to obtain one photograph.

2. The method of claim 1, wherein, determining a shooting focal distance and a shooting visual angle comprises:

determining the shooting focal distance and a shooting mode according to a selection of a user, and determining the shooting visual angle according to the shooting mode.

3. The method of claim 1, wherein processing the at least two photographs to obtain one photograph comprises:

jointing the at least two photographs together, to obtain one panoramic photograph.

4. The method of claim 3, wherein jointing the at least two photographs together comprises:

when the at least two photographs have an overlap portion, selecting the overlap portion of any photograph in the at least two photographs, or superposing the overlap portion of the at least two photographs.

5. An electronic device, with a lens assembly, the electronic device further comprising a first determination module, a second determination module, a torsion module, an imaging module and an image processing module, wherein:

the first determination module is configured to: determine a shooting focal distance and a shooting visual angle;

the second determination module is configured to: determine the number of photographs required to be shot and position information of each shooting respectively according to the shooting focal distance and the shooting visual angle which are determined, comprising: only after two boundary points are selected, calculating the number of photographs required to be shot and the position information according to zoom and selected boundary points;

the torsion module is configured to: make the lens assembly rotated to corresponding positions to shoot respectively according to the determined position information of each shooting;

the imaging module is configured to: take at least two photographs via the lens assembly, comprising all objects required to be shot in an area of the shooting visual angle, according to the shooting focal distance and the shooting visual angle which are determined; to take photographs of which the number is equal to the number of photographs required to be shot according to the determined number of photographs required to be shot; and the image processing module is configured to: process the at least two photographs to obtain one panoramic photograph.

6. The electronic device of claim 5, wherein, the first determination module is configured to: determine a shooting focal distance and a shooting visual angle by a following way:

determining the shooting focal distance and a shooting mode according to a selection of a user, and determining the shooting visual angle according to the shooting mode.

7. The electronic device according to claim 5, wherein, the image processing module is configured to: process the at least two photographs to obtain one panoramic photograph by a following way:

joining the at least two photographs, to obtain one panoramic photograph.

8. The electronic device according to claim 7, wherein, the image processing module is further configured to:

when the at least two photographs have an overlap portion, select the overlap portion of any photograph in the at least two photographs, or superpose the overlap portions of two photographs.

* * * * *